United States Patent [19]

Devry

[11] Patent Number: 4,524,093
[45] Date of Patent: Jun. 18, 1985

[54] FABRIC COATING COMPOSITION WITH LOW FORMALDEHYDE EVOLUTION

[75] Inventor: William E. Devry, Fairview Park, Ohio

[73] Assignee: The B. F. Goodrich Company, Akron, Ohio

[21] Appl. No.: 605,313

[22] Filed: Apr. 30, 1984

[51] Int. Cl.³ .......................... B05D 3/02; C08L 61/26
[52] U.S. Cl. .................................. 427/389.9; 8/115.6;
     8/182; 427/392; 427/393.2; 524/512; 525/162;
     525/163
[58] Field of Search ................ 524/512; 525/162, 163;
     528/245; 427/389.9, 392, 393.2; 8/115.6, 182

[56] References Cited

U.S. PATENT DOCUMENTS

| 3,157,562 | 11/1964 | Kine et al. | 428/375 |
| 4,076,870 | 2/1978 | Yamamoto | 427/393.2 |
| 4,198,462 | 4/1980 | Dixon et al. | 428/290 |
| 4,263,190 | 4/1981 | Zavisza | 524/512 |
| 4,295,846 | 10/1981 | Petersen et al. | 524/610 |
| 4,306,872 | 12/1981 | Herbes et al. | 427/393.2 |

Primary Examiner—Theodore E. Pertilla
Attorney, Agent, or Firm—George A. Kap; Alan A. Csontos; Carl W. Battle

[57] ABSTRACT

An improved polymeric latex coating composition, which substantially comprises an aqueous emulsion of alkyl acrylate monomers; copolymerized with acrylonitrile, itaconic acid, and N-methylol acrylamide; and containing a glyoxal curing resin and an acid catalyst, substantially reduces the evolution of formaldehyde and exhibits good durability.

9 Claims, No Drawings

FABRIC COATING COMPOSITION WITH LOW FORMALDEHYDE EVOLUTION

BACKGROUND OF THE INVENTION

Polymeric materials such as acrylics, vinyl chloride homopolymers and copolymers, styrene-butadiene copolymers, vinylidene chloride copolymers, vinyl acetate copolymers and styrene-butadiene-acrylonitrile terpolymers have been utilized in the textile industry in the production of coated fabrics. These polymeric materials are generally employed as a backcoating for textile fabrics which are used in producing home furnishings and furniture upholstery, such as placemats, tablecloths, bed and mattress covers, and draperies.

U.S. Pat. No. 3,607,341, the disclosure of which is herein incorporated by reference, describes a process for producing coated textile fabrics by foaming an aqueous emulsion polymerized latex composition, applying the foam to the fabric, crushing the partially dried and uncured foam, and thereafter drying and curing the crushed foam. Typical latexes used in this coating process are those prepared by polymerizing at least two ethylenically unsaturated monomers such as acrylic acid, methacrylic acid, itaconic acid, maleic acid, acrolein, styrene, ethyl acrylate, butyl acrylate, acrylonitrile, vinyl chloride, vinylidene chloride and the like. The curing step of the latex is generally carried out using conventional crosslinking agents, along with other additives such as catalysts or accelerators. Typical catalysts used in the cure of latexes include organic acids such as citric acid, oxalic acid, and p-toluene sulfonic acid.

U.S. Pat. No. 2,931,749 discloses fabrics bonded by a water-insoluble emulsion copolymer containing acrylic acid, methacrylic acid, itaconic acid, and salts thereof, where the copolymer is crosslinked to an insoluble condition by exposure to heat.

U.S. Pat. No. 3,157,562 discloses a fabric coating composition comprising an aqueous dispersion of a N-methylolamide/(meth)acrylic acid polymer, (meth)acrylamide, and other monomers such as acrylonitrile, styrene, vinyl toluene, vinyl acetate, and alkyl (meth)acrylates.

The cross-linked cure in most latex formulations involves formaldehyde release, usually from reaction of methylolated acrylamide, although added aminoplast crosslinkers are also a common source. Because of recent health and environmental concerns associated with formaldehyde, there is a strong desire in the textile industry to reduce emissions and exposure to formaldehyde in the workplace. Formaldehyde is known to be a skin and eye irritant. Recent studies indicate that formaldehyde is mutagenic, and perhaps carcinogenic. Accordingly, latex formulations which eliminate components which evolve formaldehyde, or which reduce such evolution, are most desirable.

U.S. Pat. Nos. 4,076,870; 4,198,462; and 4,295,846 disclose processes for treating textile fibers using glyoxal curatives for low-formaldehyde release. The '870 patent, which is incorporated by reference, discloses the use of a fluorocarboxylic acid catalyst with imidazolidinone derivatives for fabric treatment. The '462 patent, which is incorporated by reference, teaches the use of urea/formaldehyde/glyoxal for treatment of fabrics. The '846 patent, which is incorporated by reference, discloses formaldehyde-free finishing agents for textiles containing urea/glyoxal.

It is the object of the present invention to provide a latex coating composition which substantially reduces the evolution of formaldehyde, while at the same time exhibiting good dry cleaning resistance and low temperature flexibility when used as a fabric coating.

SUMMARY OF THE INVENTION

This invention relates to an improved aqueous polymeric composition, which, when used as a coating for fabrics, substantially reduces the evolution of formaldehyde, and exhibits good dry cleaning resistance and low temperature flexibility. The novel composition comprises an aqueous emulsion of acrylate monomers; copolymerized with acrylonitrile, itaconic acid, and N-methylol acrylamide; and containing a glyoxal curing resin and a Lewis acid or organic acid as a catalyst, preferably magnesium chloride. Acceptable concentrations, on a dry weight basis, of ingredients for the compositions of the present invention are from about 45% to about 95% acrylate, from about 1% to about 15% acrylonitrile, from about 0.5% to about 4% N-methylol acrylamide, from about 1% to about 15% glyoxal curing resin, from about 1% to about 4% itaconic acid, and from about 0.5% to about 10% acid catalyst.

DETAILED DESCRIPTION

This invention involves an improved aqueous polymeric composition and the use thereof to substantially reduce formaldehyde evolution during curing. This composition finds applications as a coating for textile fabrics and related substrates and exhibits good dry cleaning resistance and low temperature flexibility. The composition substantially comprises an aqueous emulsion of acrylate monomers copolymerized with acrylonitrile, itaconic acid, and N-methylol acrylamide, and containing a glyoxal curing resin and a Lewis acid or organic acid as a catalyst.

The base acrylic latexes utilized in the present invention are well known in the art. They are generally prepared by polymerizing one or more alkyl acrylate and/or methacrylates containing 1 to 18 carbon atoms in the alkyl group. One or more other copolymerizable monomers can also be included, selected from vinyl and vinylidene halides; carboxylic acids selected from $\alpha,\beta$-olefinically unsaturated carboxylic acids containing 3 to 5 carbon atoms and esters thereof containing 4 to 20 carbon atoms; mono-unsaturated dicarboxylic acids containing 4 to 8 carbon atoms; nitriles selected from $\alpha,\beta$-olefinically unsaturated nitriles containing 3 to 5 carbon atoms; acrylamides derived from acrylic and methacrylic acids and their N-alkylol and N-alkoxyalkyl derivatives containing 3 to 12 carbon atoms, polymerizable ethylenically unsaturated monocarboxylic and dicarboxylic acids containing 3 to 8 carbon atoms and esters thereof containing 4 to 20 carbon atoms; vinyl ethers containing 4 to 22 carbon atoms; vinyl ketones containing 3 to 12 carbon atoms; vinyl esters of carboxylic acids containing 4 to 22 carbon atoms; $\alpha$-olefins containing 2 to 12 carbon atoms, styrene and styrene derivatives; and other polyfunctional monomers.

The more common comonomers which are polymerized with one or more of the alkyl acrylates and/or methacrylates include styrene, acrylonitrile, acrylic acid, acrylamide, methacrylamide, N-methylol acrylamide, N-methylol methacrylamide, vinyl chloride, and itaconic acid.

In a preferred embodiment, the base acrylic latexes referred to herein are prepared by emulsion polymerization of from 45 to 95% by weight of one or more $C_1$ to $C_8$ alkyl acrylates or methacrylates and other copolymerizable monomers noted above, with such monomers including at least itaconic acid and N-methylol acrylamide.

More specifically, comonomers which can be used in the preparation of the base acrylic latexes include ethyl acrylate and/or n-butyl acrylate which can be present in an amount of about 50 to 95% by weight, acrylonitrile in an amount up to about 15%, N-methylol acrylamide in a range of about 0.5 to 4%, and itaconic acid in a range of about 1 to 4%. The preferred concentration range of itaconic acid is about 2-3% by weight of total monomer.

In the preparation of the base acrylic latexes described herein, the aqueous medium can contain suitable emulsifiers or it can be emulsiferfree. When emulsifiers are used to prepare the latexes of this invention, the usual types of anionic and nonionic emulsifers can be employed. Suitable anionic emulsifiers include alkali metal or ammonium salts of the sulfates of alcohols containing 8 to 18 carbon atoms such as sodium lauryl sulfate, alkali metal and ammonium salts of sulfonated petroleum and paraffin oils, sodium salts of sulfonic acids, aralkyl sulfonates, alkali metal and ammonium salts of sulfonated dicarboxylic acid esters, and the like. Nonionic emulsifiers, such as octyl or nonylphenyl polyethoxyethanol, can also be used. Latexes of excellent stability can be prepared with emulsifiers selected from alkali metal and ammonium salts of aromatic sulfonic acids, aralkyl sulfonates, long chain alkyl sulfonates, and poly(oxyalkylene)sulfonates.

Amount of emulsifiers can vary from about 0.01 to 5 parts by weight per 100 parts by weight of the monomers, and excellent results can be obtained with 0.01 to 1 part of emulsifiers. The base latexes described herein are more preferably prepared using very low to moderate levels of emulsifiers, such as 0.01 to 1 part by weight per 100 parts of monomer. The emulsifier can be added at the outset of the polymerization or it can be added incrementally throughout the run. Typically, a substantial amount of the emulsifier is added at the outset of the polymerization and the remainder is added incrementally to the reactor as the monomers are proportioned.

The polymerization of the acrylic latex monomers can be conducted at temperatures of about 20° to about 100° C., typically about 80° C., in the presence of a compound capable of initiating polymerization. Commonly used free radical initiators include the various peroxygen compounds such as persulfates, benzoyl peroxide, t-butyl hydroperoxide, and cumene hydroperoxide; and azo compounds such as azodiisobutyronitrile and dimethylazodiisobutyrate. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds, a reducing sugar, dimethylaminopropionitrile, a diazomercaptan compound, and a water-soluble ferrous sulfate compound. Polymer latexes with excellent stability can be obtained using alkali metal and ammonium persulfate initiators. The amount of initiator used will generally be in the range of 0.1 to 3% by weight, based on the weight of the monomers, preferably between 0.2 to 1%. The initiator can be charged at the outset of the polymerization, however, incremental addition of the initiator throughout polymerization can also be employed and is often advantageous.

Typical polymerizations for the preparation of the base acrylic latexes described herein are conducted by charging the reactor with appropriate amount of water and electrolyte, if any is employed, and a portion of the initiator sufficient to initiate polymerization. The reactor is then evacuated, heated to the initiation temperature and charged with a portion of the monomer premix which has been previously prepared by mixing water, emulsifier, the monomers and polymerization modifiers, if any are employed. After the initial monomer charge has been allowed to react for a period of time, the proportioning of the remaining monomer premix is begun, the rate of proportioning being varied depending on the polymerization temperature, the particular initiator employed and the amount of the monomer(s) being polymerized. After all the monomer premix has been charged, the final addition of initiator is made and the reactor and the latex heated with agitation for a length of time necessary to achieve the desired conversion. The pH of the latex is in the range of about 3 to 10, but generally about 5.

The total solids of the base acrylic latexes can be varied up to about 62% and may relate to the fluidity wanted in the composition. Generally, it is desirable to use a latex containing 45 to 55% solids.

The base acrylic latexes described herein can be compounded with, or have mixed therein, other known ingredients such as emulsifiers, curing agents, fillers, plasticizers, antioxidants or stabilizers, antifoaming agents, dying adjuvants, pigments, or other compounding aids. Furthermore, thickeners or bodying agents may be added to the polymer latexes so as to control the viscosity of the latexes and thereby achieve the proper flow properties for a particular application desired.

Critical to the practice of the present invention is the use of a glyoxal curing resin in the final latex coating composition. The acceptable concentration range of glyoxal curing resin is from about 1 to about 15 parts by weight per 100 parts latex on a dry weight basis, and the preferred concentration is about 4–6 parts glyoxal resin. The preferred glyoxal curing resins for use in this invention are the modified imidazolidones which may be represented by the following general formula:

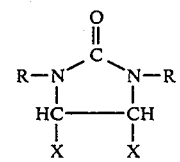

X = —H or —OH
R = —CH$_2$O—R', where R' = alkyl having 1-10 carbons.

The modified imidazolidones have been found to be low formaldehyde releasing curing resins for the acrylic latex compositions of this invention. The modified imidazolidones which are suitable for the practice of this invention include, for example, di-methoxy-methyl-dihydroxy-ethylene urea, di-ethoxy-methyl-dihydroxy-ethylene urea, and the like.

A Lewis acid or organic acid catalyst is used in the final latex composition of this invention to attain a coating with low formaldehyde evolution and good durability. Suitable catalysts include Lewis acids, such as, for example, magnesium chloride, zinc nitrate, zinc chloride, zinc borofluoride, magnesium biphosphate, ammonium chloride, aluminum chloride and the like, and organic acids such as p-toluene sulphonic acid, oxalic acid, citric acid, methane sulphonic acid and the like. Suitable concentration of catalyst ranges from about 0.5 to about 10 parts by weight per 100 parts by weight dry latex. The preferred catalyst for use in this invention is magnesium chloride ($MgCl_2$), and more preferably, magnesium chloride which is activated with citric acid. The magnesium chloride/citric acid catalyst imparts a very high rate of cure to glyoxal curative and is compatible with the other reactants. The preferred concentration of magnesium chloride catalyst is from about 0.5 to about 10 parts by weight per 100 parts by weight dry latex, and more preferably from about 1.0 to about 1.25 parts by weight $MgCl_2$ catalyst The aqueous coating composition of the present invention can be applied to the textile fibers in any suitable fashion, such as spraying, dipping, roll-transfer or the like. Application of this composition to the fibers is preferably made at room temperature, and the solids concentration of the composition can be in the range of about 5% to about 60% by weight. The aqueous composition of this invention is particularly useful in applications as a backcoating for textile fabrics. Suitable fabrics may include natural textile fibers such as jute, sisal, ramie, hemp and cotton, as well as many of the synthetic organic fibers, such as rayon, cellulose esters, vinyl resin fibers, polyacrylonitrile and copolymers thereof, polymers and copolymers of olefins such as ethylene and propylene, condensation polymers such as polyesters, polyimides or nylon types, and the like. The fabrics used can be those of a single composition or mixtures of fibers.

To illustrate this invention, polyester/cotton drapery fabric was coated with various compounds based on acrylic latex and analyzed for formaldehyde evolution and dry cleaning durability. In each case the base acrylic latex was adjusted to a pH of 8.0–8.5 using ammonium hydroxide. The compounding ingredients were then thoroughly mixed into the latex. Enough thickener was added to the latex to achieve a viscosity of about 3000 centipoise as measured by a Brookfield Viscometer at 20 rpm. The compound was then foamed by high speed mixing to a foaming ratio of about 7:1 air/latex, and applied to the fabric at a thickness of approximately 50 mils. The fabric was subsequently dried in a circulating air oven at about 124° C. for 90 seconds, crushed between steel rolls, and cured for 2½ minutes at about 135° C.

In evaluating dry cleaning durability, the fabrics were cut into 6 in.² pieces and folded in pleats such that the coated side was exposed. The specimens were put in a ball mill filled to about ⅓ capacity with borundum balls and about ⅔ capacity with perchloroethylene and rolled for 1-hour and 20-hour periods. The specimens were then evaluated for evidence of abrasion and tackiness.

To evaluate formaldehyde release, an American Association of Textile Chemists and Colorists (AATCC) Test Method 112–1982 was utilized in which the coated fabric was placed in a jar containing a wire mesh basket to hold the fabric. The jar was placed in an oven at 49° for 20 hours after the addition of 50 ml of water. The resulting water, containing the dissolved formaldehyde which evolved, was then analyzed using a liquid chromatographic procedure. A value of 300 mg formaldehyde per gram of fabric with this test is believed to correspond to an atmospheric concentration of 1 ppm formaldehyde released under normal storage conditions.

The following Examples are presented to illustrate this invention. The Examples are intended in an illustrative and not a limitative sense. All parts, percentages, and proportions of ingredients referred to herein and in the appended claims are by weight unless otherwise indicated.

EXAMPLES

| INGREDIENTS | I | II | III | IV | V | VI | VII |
|---|---|---|---|---|---|---|---|
| Base Latex A (In parts by weight, 65.4 ethyl acrylate, 20 n-butyl acrylate, 10 acrylonitrile, 2.61 itaconic acid, 1.96 n-methylol acrylamide) | 100 | 100 | 100 | 100 | — | — | — |
| Base Latex B (In parts by weight, 68.5 ethyl acrylate, 20 n-butyl acrylate, 10 acrylonitrile, 1.25 acrylic acid, 0.75 n-methyl acrylamide) | — | — | — | — | 100 | 100 | 100 |
| Glyoxal Curing Resin (Di-methoxy-methyl-dihydroxy-ethylene urea) | 5 | 5 | — | — | — | — | 5 |
| $MgCl_2$/Citric Acid | 1.25 | — | 1.25 | — | — | 1.25 | 1.25 |
| Melamine/Formaldehyde Curing Resin | — | — | — | — | 5 | — | — |

The formulations in the above examples were used for backcoating fabric specimens and evaluated for formaldehyde evolution and dry cleaning durability as rated by abrasion and tackiness. The results are presented in Table I below:

TABLE I

| Examples: | I | II | III | IV | V | VI | VII |
|---|---|---|---|---|---|---|---|
| Parameters: | | | | | | | |
| Formaldehyde Evolution (mg/g) | 169 | — | — | 85 | 570 | — | — |
| 1-hour Abrasion | None | None | None | None | None | None | None |
| 1-hour Tackiness | None | Yes (slight) | Yes | Yes | — | — | — |
| 20-hour Abrasion | None | Yes (very slight) | Yes (slight) | Yes (slight) | Yes (very slight) | Yes | Yes |
| 20-hour Tackiness | Yes (very | Yes | Yes | Yes | Yes | Yes | Yes |

TABLE I-continued

| Examples: | I | II | III | IV | V | VI | VII |
|---|---|---|---|---|---|---|---|
| | slight) | | | | | | |

Example I is encompassed within the scope of the present invention. The above results demonstrate that Example I (which contained base acrylic latex with itaconic acid and n-methylol acrylamide, glyoxal curing resin, and MgCl$_2$/citric acid catalyst) showed a significant reduction in formaldehyde evolution when compared with the typical prior art compound in Example V. Additionally, Example I showed improved dry cleaning durability over the remaining formulations.

I claim:

1. In an aqueous acrylic latex coating composition, the improvement which essentially comprises incorporating into the latex from about 1% to about 15% by dry weight of an imidazolidone curing resin of the formula

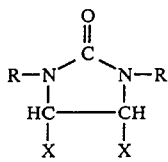

where X=—H, or —OH; and R=—CH$_2$O—R' where R' is alkyl having 1–10 carbons, and from about 0.5% to about 10% by dry weight of a metal chloride-type acid catalyst wherein said improvement substantially reduces formaldehyde evolution during curing.

2. A composition of claim 1 wherein the acrylic latex contains from about 45% to about 95% by dry weight of one or more alkyl acrylates or methacryates, from about 1% to about 15% by dry weight acrylonitrile, from about 1% to about 4% by dry weight itaconic acid, and from about 0.5% to about 4% by dry weight N-methylol acrylamide.

3. A composition of claim 1 wherein the catalyst comprises magnesium chloride and citric acid.

4. A process for substantially reducing the formaldehyde evolution from a fabric coating during curing which comprises the steps of applying to a fabric and curing an aqueous acrylic latex coating composition containing from about 1% to about 10% by dry weight of an imidazolidone curing resin having the formula

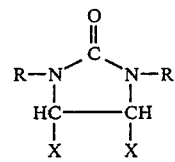

where X=—H, or —OH; and R=—CH$_2$O—R', where R' is alkyl having 1–10 carbons, and from about 0.5% to about 10% by dry weight of a metal chloride-type acid catalyst.

5. A process of claim 4 wherein the catalyst comprises magnesium chloride and citric acid.

6. A process of claim 4 wherein the acrylic latex coating composition contains from about 45% to about 95% by dry weight of one or more alkyl acrylates or methacrylates, from about 1% to about 15% by dry weight acrylonitrile, from about 1% to about 4% by dry weight itaconic acid, and from about 0.5% to about 4% by dry weight N-methylol acrylamide.

7. A composition of claim 1 wherein the imidazolidone is selected from the group consisting of di-methoxy-methyl-dihydroxy-ethylene urea and di-ethoxy-methyl-dihydroxy-ethylene urea.

8. A process of claim 4 wherein the imidazolidone is selected from the group consisting of di-methoxy-methyl-dihydroxy-ethylene urea and di-ethoxy-methyl-dihydroxy-ethylene urea.

9. A process of claim 4 wherein said acrylic latex coating composition is used as a backcoating for textile fabrics.

* * * * *